United States Patent [19]

McDaniel

[11] 4,446,117

[45] May 1, 1984

[54] DOUBLE DIGESTION SYSTEM TO REDUCE FORMATION OF FERROUS IRON

[75] Inventor: James W. McDaniel, Baton Rouge, La.

[73] Assignee: Alumina Development Corporation, Baton Rouge, La.

[21] Appl. No.: 481,821

[22] Filed: Apr. 4, 1983

[51] Int. Cl.³ .............................................. C01F 7/06
[52] U.S. Cl. .................................... 423/121; 423/127
[58] Field of Search ................ 423/119, 121, 127, 131

[56] References Cited

U.S. PATENT DOCUMENTS 2,701,751 2/1955 Porter ................................. 423/121
2,701,752 2/1955 Porter ................................. 423/121
2,852,343 9/1958 Scandrett et al. .................... 423/121

FOREIGN PATENT DOCUMENTS 269395 6/1964 Australia ............................. 423/121

Primary Examiner—Herbert T. Carter
Attorney, Agent, or Firm—Roy & Kiesel

[57] ABSTRACT

Bauxite is reacted with spent caustic soda solution at 113° C. to 205° C. to produce a first pregnant liquor stream, a granular residue stream and a muddy substance stream wherein the granular residue stream is discarded, the muddy substance stream is reacted with or without a small portion of bauxite, but with a spent caustic soda stream at 206° C. to 350° C. to produce a second pregnant liquor stream and a red mud stream which is discarded; the first and second pregnant liquor streams are filtered, cooled to 50° C. to 87° C. and then seeded to precipitate alumina hydrate containing less than 0.017% $Fe_2O_3$ by weight.

11 Claims, 1 Drawing Figure

DOUBLE DIGESTION SYSTEM TO REDUCE FORMATION OF FERROUS IRON

BACKGROUND OF THE INVENTION

1. Field of the Invention

This invention relates to a process for treating bauxite to make high purity alumina.

2. Prior Art

Bauxites are reacted with caustic soda solution at elevated temperatures to dissolve the alumina and, after cooling, the resultant slurry is separated into insoluble matter and a pregnant liquor from which alumina hydrate can be precipitated. The alumina hydrate will contain some iron oxide and, if this is above 0.017% $Fe_2O_3$, its value is decreased, as it is difficult to make high purity aluminum from the alumina hydrate.

The pregnant liquor, resulting from the reaction of bauxite and caustic soda, contains iron oxide in the form of ferric and ferrous iron, which will both co-precipitate with the alumina hydrate. The higher the digestion temperature, the greater is the amount of ferrous iron solubilized from the bauxite. The ferric iron is easily removed, using simple filtrating techniques, such as filtering the pregnant liquor through paper, sand or a synthetic cloth, whereas the ferrous iron, being in a colloidal or soluble state, is difficult to filter out unless sophisticated techniques are used, such as filtering the pregnant liquor through a bed of sand, iron grit (see U.S. Pat. No. 3,792,542) or bauxite (see U.S. Pat. No. 3,728,432) where the ferrous iron adheres to those particles due to van Der Waals forces. The disadvantages of these methods using beds of iron grit or bauxite are the high capital cost of this type of filter, difficulty in operating and increased operating cost attributable to purchasing and installing the bed.

Filtration techniques, using membranes of synthetic cloth, are simpler to operate and are used widely in the industry. In the laboratory, membranes of caustic resistant paper are used and can duplicate industrial filtration, using synthetic cloths.

Bauxites, which originate from such areas as the Darling Ranges and the Gove Peninsula in Australia or the Trombetas area of Brazil, need only be reacted with caustic soda solutions at temperatures from 113° C. to 205° C. so little ferrous iron is formed and the alumina hydrate generally contains less than 0.017% $Fe_2O_3$.

Bauxites, which originate from such areas as Weipa in Australia or Boke in West Africa, are reacted with spent caustic soda solutions, generally at more elevated temperatures ranging from 206° C. to 350° C., so a greater amount of ferrous iron is formed and the alumina hydrate can contain more than 0.017% $Fe_2O_3$ unless sophisticated techniques are used to remove all or part of the ferrous iron.

In another method (see U.S. Pat. No. 3,607,140), the iron impurities in the liquor are co-precipitated with a small amount of alumina hydrate. However, this is a sophisticated techique and consumes additional energy to redigest the alumina hydrate precipitated with the iron impurities.

In U.S. Pat. No. 4,324,769, a double digestion process is shown which lowered the iron oxide in alumina to less than 0.03% if in the second digest the mud was mixed with bauxite in the ratio of 0.1 to 2.5 times the weight of bauxite. It has now been found that this patent can be improved and is the subject of this application. To produce alumina hydrate economically and to be able to sell it, an alumina process must meet all the following constraints—low energy usage, minimum capital cost, high extraction efficiency and low iron oxide in the alumina hydrate. Other prior art either does not meet these constraints or are unlike applicant's process of this invention.

A process described in the publication entitled "Extraction of Alumina from Ferruginous Bauxite by a Double-Leech Process" by W. F. Holbrook and L. A. Yerkes and published by the U.S. Department of Interior is designed primarily for bauxites containing more than ten percent silica and entails calcining the bauxite, removing the reactive silica by leeching with ten percent caustic soda at 90° C., separating the solids from the liquor, regenerating the caustic in this liquor with lime and recirculating the liquor back to the leeching zone.

Another prior art process is discussed in Scondrett, U.S. Pat. No. 2,852,343. Two different bauxites are digested in two parallel digestive units. One bauxite is predominately trihydrate; the other is a mixture of trihydrate and monohydrate alumina. This process is unlike applicant's process of this invention.

Another prior art process is discussed in Porter, U.S. Pat. No. 2,701,751, entitled "Process for Production of Alumina" and issued February 8, 1955. The process disclosed requires the liquor obtained from the second digester unit at an $Al_2O_3$ to NaOH weight ratio of 0.42 to 0.54 be recycled to the first digester unit in order to raise its $Al_2O_3$ to NaOH weight ratio to 0.8 before it can be routed to precipitation. This recycling of the hot monohydrate alumina extraction liquor from separatory unit 2 back to the first or trihydrate digester unit upsets the heat balance on this first digester unit. That is, the temperature of the first digester effluent after the flash tank will exceed 112° C. because not enough steam can be flashed to the liquor heater and condensed by the hot recycled liquor so excessive heat losses will occur. The process described by Porter may have been acceptable when oil was $3.00 per barrel, but causes excessive heat loss for it to be used today. Porter's patent can be improved and the heat losses reduced by thirty percent by setting the conditions in the second digester unit so that the $Al_2O_3$ to NaOH weight ratio can be increased above 0.75 and the monohydrate extraction liquor then routed directly to precipitation. This, however, would not then be Porter's patent but the subject of one improvement made in this application by applicant.

Another prior art process is discussed in Australia Seimiya, et al Pat. No. 269,395 entitled "Process for Extracting Alumina from Bauxite Containing Both Alumina Monohydrate and Trihydrate". This patent discloses an unground bauxite in lump or granular form which is placed in a packed column and contacted with caustic soda at 100° C. to 140° C. to dissolve the trihydrate and leave the monohydrate undissolved. The effluent from this column is separated into sodium aluminate solution, granular residue and muddy substance. The muddy substance is discarded, the lump or granular form residue of generally plus 20 mesh containing some alumina monohydrate is digested in an autoclave digester with fresh alkali solution at a temperature greater than 160° C. The digester effluent is separated into sodium aluminate solution and a red mud which is discarded. The alumina in the sodium aluminate solution is recovered in precipitation.

This process has two serious disadvantages which can be improved as (1) it is impractical to pack a large enough column for industrial use with lumpy or unground bauxite and (2) the muddy substance discarded from the first digest can contain significant amounts of monohydrate alumina and make the process uneconomical and this is indicated in the two examples quoted by the low extraction rate of 89.5% and 90.1%, respectively.

Seimiya's patent can be improved by grinding the bauxite in caustic liquor so it can be pumped in slurry form into digesters to be reacted with caustic soda. The grinding of the bauxite makes a majority of the monohydrate alumina report to the muddy substance and not to the granular residue and the alumina monohydrate can then be extracted from the muddy substance and this is one improvement considered in this application by McDaniels.

SUMMARY OF THE INVENTION

Therefore, one object of this invention is to grind the bauxite with spent caustic soda solution and pump the bauxite slurry into autoclave digesters so that packed columns of lumpy bauxite do not have to be used.

Another object of this invention is to extract the monohydrate alumina from the muddy substance and extract greater than ninety-two percent of the total available alumina in the bauxite.

Another object of this invention is to discard a granular residue so that this material does not erode tubular slurry heat exchangers.

Another object of this invention is to provide a process to minimize solubilizing the ferrous iron from bauxites which have to be reacted with spent caustic soda solution at temperatures ranging from 206° C. to 350° C., so that the pregnant liquor produced can be filtered using simple techniques, such as filtering through paper, sand or a synthetic cloth and the alumina hydrate precipitated will contain less than 0.017% iron oxide by weight.

Another object of this invention is to filter pregnant liquor through a synthetic cloth with a lime filter aid so that the filtrate contains less than 0.013 grams per liter $Fe_2O_3$.

Another object of this invention is to improve the double digestion process and reduce the energy consumption thirty percent by having an $Al_2O_3$ to NaOH weight ratio of 0.75 to 1.05 in the pregnant slurry leaving the digester unit operating at 206° C. to 350° C. so that the second pregnant liquor stream from the separatory unit can be routed directly to precipitation at an $Al_2O_3$ to NaOH weight ratio of 0.75 to 1.05 and, therefore, not have to be routed back to the digester unit operating at 113° C. to 205° C. to have its $Al_2O_3$ to NaOH weight ratio increased to a level of 0.75 to 1.05, that which is the ratio required for precipitation to be carried out.

Another object of this invention is to design a double digestion process so that the heat added to digestion will be less than 2.3 million British Thermal Units per ton of alumina hydrate precipitated.

Another object of this invention is to recover the heat in the digester effluent so its temperature is below 112° C. for maximum steam and heat recovery.

These and other objects and advantages of this invention shall become apparent from the ensuing descriptions of the invention.

Accordingly, a bauxite is ground with a spent caustic soda solution and pumped as a slurry into digesters and reacted at a temperature ranging from 113° C. to 205° C. with additional spent caustic soda solution, the effluent is cooled in flash tanks to 88° C. to 112° C., a granular residue is classified out and discarded, a pregnant slurry is separated into a muddy substance and a first pregnant liquor which is filtered, cooled to 50° C. to 87° C. and routed to precipitation with an $Al_2O_3$ to NaOH weight ratio of 0.75 to 1.05, the muddy substance is reacted in a digester with or without a small amount of bauxite but with a spent caustic soda stream at 206° C. to 350° C., the pregnant slurry or digester effluent is cooled in flash tanks to 88° C. to 112° C. and then separated into a second pregnant liquor and a red mud which is discarded, the second pregnant liquor with an $Al_2O_3$ to NaOH weight ratio of 0.75 to 1.05 is filtered, cooled to 50° C. to 87° C. and routed to precipitation, alumina hydrate seed is added to the combined filtered pregnant liquor in precipitation to precipitate alumina hydrate which is then separated from a spent caustic soda solution. The spent caustic soda solution is then recirculated to the bauxite grinding vessel and the two digestion units. A portion of the separated alumina hydrate is recycled as seed, the remainder is washed with hot water and will contain less than 0.017% $Fe_2O_3$.

PREFERRED EMBODIMENTS OF THE INVENTION

Figure 1:
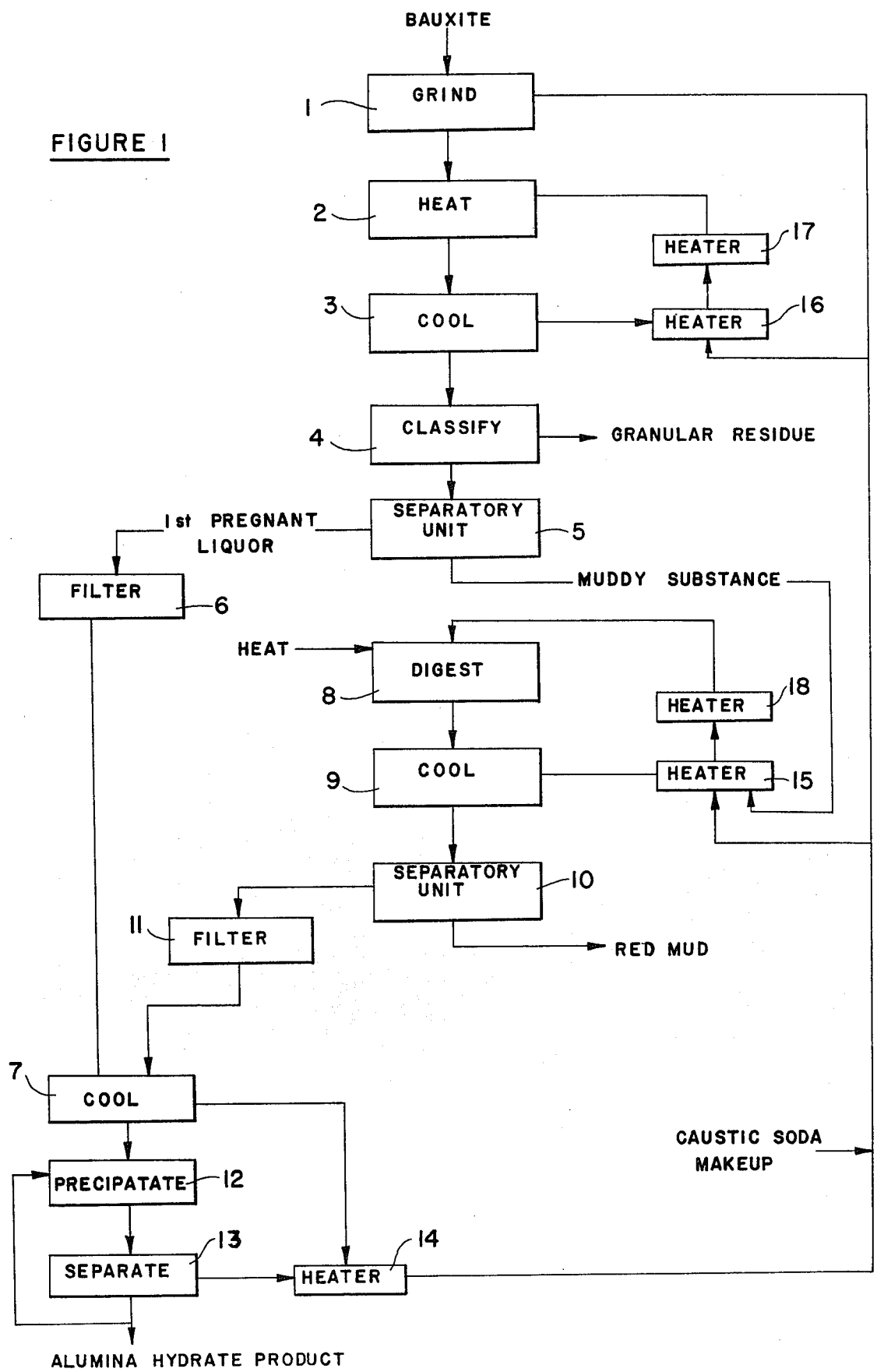
FIG. 1 is a flowsheet illustrating one preferred embodiment of this invention.

Referring now to FIG. 1, bauxite is ground to less than 0.2 inches but preferably to less than 0.1 inches with a spent caustic soda stream in vessel 1 to form a bauxite slurry. The bauxite slurry is pumped into reaction vessel 2 and reacted at 113° C. to 205° C. for 2–200 minutes with more spent caustic soda solution to form a stream of pregnant liquor granular residue and muddy substance. Heat is added to reaction vessel 2 but can also be added as hot flux or boiler steam to heat exchange vessel 17. The bauxite is kept in suspension in reaction vessel 2 and this vessel does not contain a packed column of lumpy bauxite. The effluent from reaction vessel 2 is cooled, preferably in vessel 3 to 88° C. to 112° C., with steam flashing to heat exchanger 16. The effluent from vessel 3 is classified or screened at a 10 to 100 mesh cut but preferably at 20 mesh to separate a granular residue stream from a first pregnant slurry stream. The granular residue stream is sent to disposal as it causes erosion problems in tubular heat exchangers. The first pregnant slurry stream from vessel 4 is introduced into separatory unit 5 and separated into a muddy substance stream and a first pregnant liquor stream with an $Al_2O_3$ to NaOH weight ratio of 0.75 to 1.05. The first pregnant liquor stream is filtered in vessel 6 comprising a synthetic cloth or sand bed to give a first filtrate stream which is introduced into cooling vessel 7 and cooled to 50° C. to 87° C. with steam flashing to heat exchanger 14.

The muddy substance stream is introduced into second reaction vessel 8 either directly or via heat exchanger 15. Spent caustic soda solution is heated in heat exchanger 15, 18 and then introduced into vessel 8. Heat, either as boiler steam or a hot salt, is added either to vessel 8 or heat exchanger 18. Reaction vessel 8 provides 2–200 minutes holding time at 206° C to 250°

C. to extract the monohydrate alumina from the muddy substance and a second pregnant slurry is formed comprising a second pregnant liquor stream and a red mud stream. The second pregnant slurry stream is cooled to 88° C. to 112° C. in vessel 9 with steam flashing to heat exchanger 15, then introduced into separatory unit 10 and separated into the red mud stream and second pregnant liquor stream. The red mud stream is discarded and the second pregnant liquor stream having an $Al_2O_3$ to NaOH weight ratio of 0.75 to 1.05 is filtered in vessel 11 having either a synthetic cloth or sand bed to produce a second filtrate stream. In a preferred embodiment, a lime filter aid can be used in filter vessel 11.

The second filtrate stream is introduced into vessel 7 and cooled to 50° to 87° C. with steam flashing to heater 14. The first and second filtrate streams of $Al_2O_3$ to NaOH weight ratio of 0.75 to 1.05 are combined, cooled and introduced to vessel 12 with alumina hydrate seed added to vessel 12 to produce as a precipitant the desired alumina hydrate having less than 0.017% by weight $Fe_2O_3$. The precipitant stream is introduced to hydrate separatory unit 13 and separated into a spent caustic soda stream and an alumina hydrate stream. A portion of the alumina hydrate stream is recirculated to vessel 12 as seed, the remainder is washed with hot water for product. The spent caustic soda stream is recirculated back to vessel 1, 2, 8 and new caustic soda is added to make up for losses.

Heat added to digestion is the total British Thermal Units added to vessels 2, 8 and heat exchangers 17, 18 and can be in the form of boiler house steam, hot salt or hot oil. The heat used in the digestion process is shown in British Thermal Units per hour or per ton of alumina hydrate precipitated.

In an alternate preferred embodiment, it has been found that alumina hydrate containing less than 0.017% $Fe_2O_3$ by weight can still be precipitated if a proportion of bauxite is mixed with the muddy substance stream before reacting with spent caustic soda streams at temperatures ranging from 206° C. to 350° C., however, the proportion of bauxite added should not exceed 0.4 times the weight of muddy substance. Conversely, the ratio of muddy substance to bauxite must be greater than 2.5, i.e, $\frac{Bauxite}{Mud}$ = Less than 0.4, conversely, $\frac{Mud}{Bauxite}$ = Greater $\frac{1}{0.4}$ – Greater 2.5

If the bauxite is between 0.4 to 2.5 times the weight of muddy substance, the alumina hydrate can contain 0.017% to 0.02% $Fe_2O_3$ but generally less than 0.02% $Fe_2O_3$ by weight of alumina hydrate.

Caustic soda solutions can be used ranging in concentration from 100 to 425 grams per liter NaOH but more preferably in the range of 120 to 200 grams per liter NaOH. Caustic soda solutions can be used which contain residual amounts of alumina and are then called spent caustic soda solutions or spent liquor but the weight ratio of $Al_2O_3$ to NaOH should not exceed 0.55.

The pregnant liquor resulting from the reaction of bauxite and caustic soda solutions or bauxite mixed with muddy substance or muddy substance only should have $Al_2O_3$ to NaOH weight ratio of 0.75 to 1.05 to satisfy precipitation requirements.

The concentration of caustic soda in grams per liter NaOH can be expressed in equivalent terms of $Na_2CO_3$ by multiplying by 1.325 or in equivalent terms of $Na_2O$ by multiplying by 0.775.

It has been found that if pregnant liquor when filtered contains less than 0.013 grams per liter $Fe_2O_3$ in the filtrate, the alumina hydrate precipitated should contain less than 0.017% $Fe_2O_3$ by weight.

The total available alumina in a bauxite can be defined as that alumina which can be extracted at most favorable digest conditions, such as high caustic concentration, high temperature and low $Al_2O_3$ to NaOH weight ratio in the resulting sodium aluminate liquor. One such condition for determining total available alumina would be caustic concentration 200 grams per liter NaOH, 250° C., $Al_2O_3$ to NaOH weight ratio of 0.45. Such a low $Al_2O_3$ to NaOH weight ratio of liquor gives very high alumina extraction but does not contain enough dissolved alumina to be routed to precipitation and as such, an economic balance must be achieved between alumina extraction and precipitation for alumina processes.

The double digestion process has been improved to
 (1) minimize solubilizing ferrous iron when monohydrate has to be extracted from bauxite so that simple filtration techniques can be used to produce alumina hydrate containing less than 0.017% $Fe_2O_3$,
 (2) extract the monohydrate from the muddy substance,
 (3) use less than 2.3 million British Thermal Units in digestion per ton of alumina hydrate precipitated, and
 (4) recover heat from the digester effluent as its temperature is reduced to below 112° C. to feed the separatory units.

Example 1 is exemplary of a procedure not utilizing the preferred embodiments of this invention.

EXAMPLE 1

Boke bauxite of the following composition was used:
Total available Alumina (TAA):58.0%
Trihydrate Available Alumina (THA):51.0%
Monohydrate Alumina (MHA):7.0%

90 grams of Boke bauxite ground to minus 0.1 inches was heated in a reactor for thirty minutes at 240° C. with one liter of spent caustic soda solution containing 150 grams per liter NaOH, 73.5 grams per liter $Al_2O_3$ and with an $Al_2O_3$ to NaOH weight ratio of 0.49.

The contents of the reactor were cooled to 93° C. and filtered on a No. 1 Whatman paper to give a red mud and a filtrate. The red mud was washed with water, dried, weighed and analyzed for available alumina (TOTAL). 20 milliliters of the filtrate was analyzed for $Al_2O_3$, NaOH, $Fe_2O_3$. 980 milliliters of the filtrate was cooled to 60° C., one gram of alumina hydrate containing 0.001% $Fe_2O_3$ was added to enhance the precipitation of alumina hydrate from the filtrate and agitation commenced and continued until the ratio of $Al_2O_3$ to NaOH in the filtrate reduced to 0.49. The resulting hydrate slurry was filtered on a No. 1 Whatman paper and the alumina hydrate retained on the paper was washed with water until the washings were free of caustic soda and then the alumina hydrate was dried, weighed and analyzed for $Fe_2O_3$. From the weight and analysis of the bauxite and red mud, the total avilable alumina extracted was calculated.

| RESULTS FROM EXAMPLE 1 | | | |
|---|---|---|---|
| Filtrate | NaOH | grams/liter | 147.0 |
| Filtrate | Al$_2$O$_3$ | grams/liter | 123.4 |
| Filtrate | Ratio | Al$_2$O$_3$/NaOH | 0.84 |
| Filtrate | Fe$_2$O$_3$ | grams/liter | 0.017 |
| Alumina Hydrate | Weight | grams | 75.3 |
| | Fe$_2$O$_3$ | percent | 0.023 |
| Total Available Alumina (TAA) Extracted from Bauxite | | percent | 94.3 |

The preferred embodiments of this invention will now be illustrated by way of examples 2, 3, 4, 5. In regard to examples 2, 3, the invention is described as a batchwise process, it being understood that the process may be advantageously operated continuously. Examples 4, 5 show data illustrative of a typical operation of a flow diagram of the Improved Double Digestion Process shown in FIG. 1 to minimize solubilizing ferrous iron but it is not intended to constitute a limitation of the invention.

Example 2

90 grams of Boke bauxite ground to minus 0.1 inches and of the same composition as used in example 1 was heated in a reactor for thirty minutes at 150° C. with 0.84 liters of spent caustic soda solution of same composition as used in example 1.

The contents of the reactor were cooled to 93° C. and screened on a 20 mesh screen to remove the granular residue from the pregnant slurry. The granular residue on the screen was washed, dried, weighed and analyzed. The pregnant slurry was filtered on a No. 1 Whatman filter paper to separate the muddy substance from the first filtrate which was placed in Container A. The muddy substance was hosed off the filter paper into a reactor with 0.16 liter of spent caustic soda solution of the same composition as used in example 1. The reactor and its contents were heated for thirty minutes at 240° C.

The contents of the reactor were cooled to 93° C. and filtered on a No. 1 Whatman paper to separate the red mud from the filtrate which was placed in container A with the first filtrate. 20 milliliters of the combined filtrate or filtered pregnant liquor from container A was analyzed for Al$_2$O$_3$, NaOH, Fe$_2$O$_3$.

980 milliliters of the combined filtrate from container A was cooled to 60° C., one gram of alumina hydrate was added containing 0.001% Fe$_2$O$_3$ to enhance precipitation of alumina hydrate and agitation commenced and continued until the Al$_2$O$_3$ to NaOH weight ratio reduced to 0.49 in the liquor. The resulting hydrate slurry was filtered on a No. 1 Whatman paper and the alumina hydrate retained on the paper was washed with water until the washings were free of caustic soda and then the alumina hydrate was dried, weighed and analyzed for Fe$_2$O$_3$. From the weight and analysis of the bauxite, granular residue and red mud, the total available alumina extracted from the bauxite was calculated.

| RESULTS FROM EXAMPLE 2 | | | |
|---|---|---|---|
| Combined Filtrate | NaOH | grams/liter | 147.1 |
| | Al$_2$O$_3$ | grams/liter | 121.2 |
| | Ratio | Al$_2$O$_3$/NaOH | 0.82 |
| | Fe$_2$O$_3$ | grams/liter | 0.009 |
| Alumina Hydrate | Weight | grams | 76.6 |
| | Fe$_2$O$_3$ | percent | 0.012 |

-continued

| RESULTS FROM EXAMPLE 2 | | | |
|---|---|---|---|
| Total Available Alumina (TAA) Extracted from Bauxite | | percent | 96.0 |

EXAMPLE 3

81.4 grams of Boke bauxite ground to minus 0.1 inches and of the same composition as used in examples 1 and 2 was heated in a reactor for thirty minutes at 150° C. with 0.76 liters of spent caustic soda solution of the same composition as examples 1 and 2.

The contents of the reactor were cooled to 93° C. and screened on a 20 mesh screen to remove the granular residue from the pregnant slurry. The granular residue on the screen was washed, dried, weighed and analyzed. The pregnant slurry was filtered on a No. 1 Whatman filter paper to separate the muddy substance from the first filtrate which was placed in container B. The muddy substance on the filter paper was weighed and then hosed off into a reactor with 0.24 liter of spent caustic soda solution of the same composition as example 1. 8.6 grams of Boke bauxite of the same composition of example 1 was also placed in the reactor. The reactor and its contents were heated for thirty minutes at 240° C.

The contents of the reactor were cooled to 93° C. and filtered on a No. 1 Whatman paper to separate the red mud from the filtrate which was placed in container B with the first filtrate. 20 milliliters of the combined filtrate or filtered pregnant liquor from container B was analyzed for Fe$_2$O$_3$, Al$_2$O$_3$, NaOH.

980 milliliters of the combined filtrate from container B was cooled to 60° C., one gram of alumina hydrate was added containing 0.001% Fe$_2$O$_3$ to enhance precipitation of alumina hydrate and agitation commenced and continued until the Al$_2$O$_3$ to NaOH weight ratio reduced to 0.49 in the liquor. The resulting hydrate slurry was filtered on a No. 1 Whatman paper and the alumina hydrate retained on the paper was washed with water until the washings were free of caustic soda and then the alumina hydrate was dried, weighed and analyzed for Fe$_2$O$_3$. From the weight and analysis of the bauxite, granular residue and red mud, the total available alumina extracted from the bauxite was calculated.

| RESULTS FROM EXAMPLE 3 | | | |
|---|---|---|---|
| Weight of Muddy Substance | | grams | 21.6 |
| Weight of Bauxite Mixed with Muddy Substance | | grams | 8.6 |
| Combined Filtrate | NaOH | grams/liter | 147.0 |
| | Al$_2$O$_3$ | grams/liter | 120.8 |
| | Ratio | Al$_2$O$_3$/NaOH | 0.82 |
| | Fe$_2$O$_3$ | grams/liter | 0.010 |
| Alumina Hydrate | Weight | grams | 76.3 |
| | Fe$_2$O$_3$ | percent | 0.013 |
| Total Avaliable Alumina (TAA) Extracted from Bauxite | | percent | 95.5 |

EXAMPLE 4

With reference to FIG. 1, 3404 tons per day of bauxite containing 53% total available alumina, 46% trihydrate available alumina and 7% monohydrate alumina was ground in a ball mill with spent caustic soda solution to a size less than 0.1 inches. The concentration of the spent caustic soda solution called spent liquor was 143.4 grams per liter NaOH and 73 grams per liter $Al_2O_3$ and 550 gallons per minute used. The bauxite slurry at 45% solids was pumped into a digester and mixed with 4176 gallons per minute of hot spent liquor of 143.4 gpl NaOH and 73 gpl $Al_2O_3$.

Heat was added to the digester at the rate of 152 million British Thermal Units (BTU) per hour to heat the slurry to 150° C. and the digester provides 30 minutes of continuous holding time. The digester effluent of $Al_2O_3$ to NaOH weight ratio of 0.87 was cooled to 100° C. in a flash tank with steam flashing to a heater. The flash tank effluent is classified in a classifier to remove a granular residue of plus 20 mesh from a pregnant slurry.

54 tons per day of the granular residue containing 29.6% total available alumina was washed with hot water and discarded. The pregnant slurry was separated in a settler into pregnant liquor and muddy substance.

The pregnant liquor was pumped to a filter and filtered through a synthetic cloth with a lime filter aid. This first filtrate of $Al_2O_3$ to NaOH weight ratio of 0.87 was cooled to 70° C. in a flash tank with steam flashing to a heater.

1120 tons per day of muddy substance containing 29.6% total available alumina was pumped at 35% solids through a heater into a digester. 1274 gallons per minute of spent liquor of concentration 143.4 grams per liter NaOH 73 grams per liter NaOH was pumped through the heater into a digester. Heat was added to the digester at the rate of 60 million British Thermal Units per hour to heat the slurry to 240° C. The digester provides 20 minutes of continuous holding time. The digester effluent of $Al_2O_3$ to NaOH weight ratio of 0.78 was cooled in a flash tank to 100° C. and steam flashing to a heater. The flash tank effluent was separated in a settler into pregnant liquor and red mud. 830 tons per day of red mud containing 5.9% total available alumina was washed with hot water and discarded. The pregnant liquor was pumped to a filter and filtered through a synthetic cloth with a lime filter aid. This second filtrate of $Al_2O_3$ to NaOH weight ratio of 0.78 was cooled in a flash tank to 70° C. with steam flashing to a heater.

The first and second filtrates were combined and analyzed 0.009 grams per liter $Fe_2O_3$ and pumped to a precipitator and seed added from the settler. Precipitation was carried out for 30 hours and 2653 tons per day of alumina hydrate was precipitated analyzing 0.012% $Fe_2O_3$. The alumina hydrate was separated in the settler, seed was recirculated to precipitation and 2653 tons per day of alumina hydrate was washed with water and removed as product. Spent liquor was recirculated to digestion and ball mill.

96.4% of the total available alumina was extracted from the bauxite and 1.92 million British Thermal Units was added to the digesters per ton of alumina hydrate precipitated containing 0.012% of $Fe_2O_3$.

EXAMPLE 5

With reference to FIG. 1, 3462 tons per day of bauxite containing 53% total available alumina, 46% trihydrate available alumina and 7% monohydrate alumina was ground in a ball mill with 560 gallons per minute of spent caustic soda solution called spent liquor to a size less than 0.1 inches. The spent liquor contained 143.4 grams per liter NaOH and 73 grams per liter $Al_2O_3$. 88.5 percent of the bauxite slurry at 45% solids was pumped into a digester and mixed with 3740 gallons per minute of hot spent liquor containing 143.4 grams per liter NaOH, 73 grams per liter $Al_2O_3$. Heat was added to the digester at the rate of 143 million British Thermal Units per hour to heat the slurry to 150° C. The digester provides 30 minutes of continuous holding time. The digester effluent of $Al_2O_3$ to NaOH weight ratio of 0.87 was cooled in a flash tank to 100° C. with steam flashing to a heater. The flash tank effluent was classified in a classifier to give a 20 mesh separation of granular residue and pregnant slurry. 49 tons per day of granular residue containing 29.6% total available alumina was washed with hot water and discarded. The pregnant slurry was separated in a settler into pregnant liquor and muddy substance.

The pregnant liquor was pumped to a filter and filtered through synthetic cloth with a lime filter aid. The filtrate of $Al_2O_3$ to NaOH weight ratio of 0.87 was cooled in a flash tank to 70° C. with steam flashing to a heat exchanger. 1007 tons per day of muddy substance was pumped at 35% solids through a heater into a digester. 1764 gallons per minute of spent liquor of 143.4 grams per liter NaOH, 73 grams per liter $Al_2O_3$ was pumped through the heater into the digester. 11.5% of the bauxite slurry from the ball mill and containing 400 tons per day of bauxite was pumped into the digester where heat was added at the rate of 67 million British Thermal Units per hour to heat the slurry for 20 minutes at 240° C. The digester effluent of $Al_2O_3$ to NaOH weight ratio of 0.8 was cooled to 100° C. in a flash tank with steam flashing to a heater. The flash tank effluent was separated in a settler into pregnant liquor and red mud. 853 tons per day of red mud containing 10% total available alumina was washed with hot water and discarded. The pregnant liquor was pumped to a filter and filtered through a synthetic cloth with a lime filter aid. The filtrate of $Al_2O_3$ to NaOH weight ratio of 0.8 was cooled in a flash tank to 70° C. with steam flashing to a heater.

The combined filtrate analyzed 0.010 grams per liter $Fe_2O_3$ and was pumped to a precipitator where seed was added from the settler. Precipitation was carried out for 30 hours and 2654 tons per day of alumina hydrate was precipitated. The alumina hydrate was separated from the spent liquor in the settler, seed was recirculated to a precipitator and 2654 tons per day of alumina hydrate was washed with hot water for product and analyzed 0.013% $Fe_2O_3$.

94.6% of the total available alumina was extracted from the bauxite and 1090 million British Thermal Units was added to the digesters per ton of alumina hydrate precipitated containing 0.013% $Fe_2O_3$.

There are, of course, other modifications of this invention not specifically described, but which are intended to be included within the scope of this invention as defined by the following claims.

What I claim is:

1. A process to produce alumina hydrate containing less than 0.017% by weight of $Fe_2O_3$, which comprises:
   (a) mixing a ground bauxite with a first spent caustic soda stream to form a bauxite slurry;
   (b) reacting at 113° C. to 205° C. said bauxite slurry with a second spent caustic soda stream to form a first reactant product slurry comprising
      (i) a first pregnant liquor stream having an alumina to NaOH weight ratio of 0.75 to 1.05,
      (ii) a first granular residue stream, and
      (iii) a first muddy substance stream;

(c) cooling said first reactant products slurry to 88° C. to 112° C.;

(d) removing said first granular residue stream;

(e) separating said first pregnant liquor stream from said first muddy substance stream;

(f) filtering said first pregnant liquor stream through a first paper, sand or synthetic cloth to produce a first filtrate stream having an $Al_2O_3$ to NaOH weight ratio of 0.75 to 1.05;

(g) reacting at 206° C. to 350° C. said first muddy substance stream with a third spent caustic stream to form a second reactant products slurry comprising:

(i) a second pregnant liquor stream having an $Al_2O_3$ to NaOH weight ratio of 0.75 to 1.05, and (ii) a red mud stream;

(h) cooling said second reactant products slurry to 88° C. to 112° C.;

(i) removing said red mud stream;

(j) filtering said second pregnant liquor stream through a second paper, sand or synthetic cloth to produce a second filtrate stream having an $Al_2O_3$ to NaOH weight ratio of 0.75 to 1.05;

(k) combining said first and second filtrate streams and cooling same to 50° C. to 87° C.; and (l) precipitating alumina hydrate from the cooled filtrate streams.

2. A process according to claim 1 wherein said first spent caustic soda stream has a concentration of 100 to 400 grams per liter NaOH and an $Al_2O_3$ to NaOH weight ratio less than 0.55.

3. A process according to claim 1 wherein said second spent caustic soda stream has a concentration of 110 to 225 grams per liter NaOH.

4. A process according to claim 1 wherein the said second pregnant liquor stream has an $Al_2O_3$ to NaOH weight ratio of 0.75 to 1.05 and is routed directly to filtration and precipitation.

5. A process according to claim 1 wherein bauxite is also reacted at 206° C. to 350° C. with said first muddy substance stream and said third spent caustic soda stream.

6. A process according to claim 5 wherein said third spent caustic soda stream has a concentration of 100 to 400 grams per liter NaOH and an $Al_2O_3$ to NaOH weight ratio less than 0.55.

7. A process according to claim 5 wherein said third spent caustic soda stream has a concentration of 110 to 225 grams per liter NaOH.

8. A process according to claim 5 wherein the proportion of said bauxite mixed with said first muddy substance is less than 0.4 times the weight of said first muddy substance stream.

9. A process according to claim 5 wherein the proportion of said first muddy substance stream is greater than 2.5 times the weight of bauxite.

10. A process according to claim 5 wherein the total heat added during said process is less than 2.3 million British Thermal Units per ton of alumina hydrate precipitated.

11. A process according to claim 5 wherein heat is recovered after reacting to form said first and second reactant product streams.

* * * * *